United States Patent
Kong et al.

(10) Patent No.: US 10,212,735 B2
(45) Date of Patent: Feb. 19, 2019

(54) COMMUNICATIONS METHOD AND DEVICE FOR SINGLE-FREQUENCY WIRELESS LOCAL AREA NETWORK

(71) Applicant: HUAWEI TECHNOLOGIES CO., LTD., Shenzhen (CN)

(72) Inventors: Weiqiang Kong, Shenzhen (CN); Xinmin Yu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 14/945,619

(22) Filed: Nov. 19, 2015

(65) Prior Publication Data

US 2016/0081120 A1    Mar. 17, 2016

Related U.S. Application Data

(63) Continuation of application No. PCT/CN2013/075927, filed on May 20, 2013.

(30) Foreign Application Priority Data

May 20, 2013  (CN) .......................... 2013 1 0187567

(51) Int. Cl.
*H04W 74/08*    (2009.01)
*H04W 72/04*    (2009.01)
(Continued)

(52) U.S. Cl.
CPC ... *H04W 74/0816* (2013.01); *H04W 72/0453* (2013.01); *H04W 84/12* (2013.01); *H04W 88/12* (2013.01)

(58) Field of Classification Search
CPC ..... H04W 88/12; H04W 84/12; H04W 72/12; H04W 84/02; H04H 20/42; H04H 20/30; H04L 2012/5631; H04Q 2213/13526
(Continued)

(56) References Cited

U.S. PATENT DOCUMENTS 8,305,948 B2    11/2012  Surineni et al.
2006/0087974 A1*  4/2006  Ozer ................... H04L 12/2854
                                                    370/235
(Continued)

FOREIGN PATENT DOCUMENTS

CN    1917462 A    2/2007
CN    101548573    9/2009
(Continued)

OTHER PUBLICATIONS

Calcev; George, "U.S. Appl. No. 61/716,235,Claims,Oct. 19, 2012".*
(Continued)

*Primary Examiner* — Brandon M Renner
*Assistant Examiner* — The Hy Nguyen
(74) *Attorney, Agent, or Firm* — Staas & Halsey LLP

(57) ABSTRACT

Embodiments of the present invention provide a communications method and device for a single-frequency WLAN. An AP monitors a CTS or RTS packet whose receiver or sender is a neighboring AP inside the single-frequency WLAN; and when a CTS or RTS packet whose receiver or sender is a neighboring AP inside the single-frequency WLAN is detected, a channel in a coverage direction of the AP is cleared. Multiple APs in the single-frequency WLAN form one "omnidirectional group". When any of the APs in the "omnidirectional group" performs RTS/CTS exchange with a STA inside a coverage area of the AP, neighboring APs can also work cooperatively, channels in coverage directions of the neighboring APs are cleared, and data communication in the coverage directions of the neighboring APs is suspended, thereby effectively avoiding network conflicts, and improving network performance of the single-frequency WLAN.

12 Claims, 7 Drawing Sheets

(51) Int. Cl.
*H04W 84/12* (2009.01)
*H04W 88/12* (2009.01)

(58) Field of Classification Search
USPC .................................................. 370/458, 329
See application file for complete search history.

(56) References Cited

U.S. PATENT DOCUMENTS

| | | | |
|---|---|---|---|
| 2006/0221920 A1* | 10/2006 | Gopalakrishnan ... | H04B 7/0617 370/338 |
| 2006/0240780 A1* | 10/2006 | Zhu ................... | H04W 74/0808 455/63.4 |
| 2007/0041334 A1 | 2/2007 | Song et al. | |
| 2008/0063106 A1 | 3/2008 | Hahm et al. | |
| 2008/0192707 A1 | 8/2008 | Xhafa et al. | |
| 2010/0220699 A1* | 9/2010 | Gopalakrishnan ........................... | H04W 74/0816 370/338 |
| 2011/0038332 A1* | 2/2011 | Liu ....................... | H04L 1/1685 370/329 |
| 2011/0205961 A1* | 8/2011 | Santivanez ....... | H04W 74/0816 370/328 |
| 2012/0051247 A1* | 3/2012 | Erven ................. | H04W 56/001 370/252 |
| 2012/0207036 A1* | 8/2012 | Ong ................... | H04W 74/0816 370/252 |
| 2012/0327870 A1* | 12/2012 | Grandhi ................ | H04W 28/06 370/329 |
| 2014/0112325 A1* | 4/2014 | Calcev ................. | H04W 48/16 370/338 |
| 2014/0112327 A1* | 4/2014 | Calcev ................. | H04W 48/14 370/338 |

FOREIGN PATENT DOCUMENTS

| | | |
|---|---|---|
| CN | 102123010 A | 7/2011 |
| CN | 102158985 A | 8/2011 |
| CN | 102325327 A | 1/2012 |
| CN | 102523608 A | 6/2012 |
| WO | 2013/022253 A2 | 2/2013 |

OTHER PUBLICATIONS

Calcev; George, "U.S. Appl. No. 61/716,235,Specification,Oct. 19, 2012".*
Calcev; George, "U.S. Appl. No. 61/748,673,Specificaiton,Jan. 3, 2013".*
International Search Report dated Feb. 20, 2014, in corresponding International Application No. PCT/CN2013/075927.
International Search Report dated Feb. 20, 2014 in corresponding International Patent Application No. PCT/CN2013/075927.
Office Action, dated Mar. 1, 2017, in Chinese Application No. 201310187567.X (7 pp.).

* cited by examiner

COMMUNICATIONS METHOD AND DEVICE FOR SINGLE-FREQUENCY WIRELESS LOCAL AREA NETWORK

CROSS-REFERENCE TO RELATED APPLICATIONS

This application is a continuation of International Application No. PCT/CN2013/075927, filed on May 20, 2013, which claims priority to Chinese Patent Application No. 201310187567.X, filed on May 20, 2013, both of which are hereby incorporated by reference in their entireties.

TECHNICAL FIELD

The present invention relates to the field of wireless local area network technologies, and in particular, to a communications method and device for a single-frequency wireless local area network.

BACKGROUND

A channel in a wireless local area network (WLAN) is an exclusive channel. When one terminal (Station, STA) communicates with an access point (AP), a wireless channel is occupied. During such a process, another STA has to wait. 802.11 allows a STA to use an RTS frame and a CTS frame to clear a transmit area, that is, before data is sent, the STA first instructs other STAs around not to send data at this moment. As shown in FIG. 1, when a device 1 sends data to a device 2 in a WLAN, the device 1 sends an RTS packet to the device 2. In this way, after receiving a RTS packet, none of other devices sends data within a specified period of time. After receiving a RTS packet, the device 2 sends one CTS packet again. In this way, it is ensured that none of the other devices sends data within a specified period of time. After exchange of RTS/CTS packets is completed, transmission of data starts between the device 1 and the device 2 (see step 3 in FIG. 1). After transmission of data is completed, the device 2 returns an ACK (see step 4 in FIG. 1). FIG. 2 shows a process of signaling exchange between the device 1 and the device 2. After RTS/CTS exchange between the device 1 and the device 2 is completed, transmission of data starts until the transmission is completed.

In the prior art, a case in which more than two WLAN APs form a network (a single-frequency WLAN for short) to operate may occur. In an example shown in FIG. 3, three WLAN APs, that is, AP1, AP2, and AP3, are distributed at a same point to form a single-frequency network, in which directional antennas are used, and each AP covers an area of 120 degrees. A STA is connected to an AP to perform a data service.

In the foregoing case, when sta1 inside a coverage area of AP1 performs data communication with AP1, sta2 (located inside a coverage area of AP2) and sta3 (located inside a coverage area of AP3) may also perform data communication with AP2 and AP3 respectively.

Because channels used for data communication are limited in a single-frequency WLAN with multiple APs, it is likely that AP1, AP2, and AP3 share a same channel when communicating respectively with STAs inside respective corresponding coverage areas. In this case, mutual interference is caused inside coverage areas of AP1, AP2, and AP3, and network performance is severely affected.

SUMMARY

Embodiments of the present invention provide a communications method and device for a single-frequency WLAN, to resolve existing problems that mutual interference exists and network performance is affected during operation of a single-frequency WLAN with more than two APs.

According to a first aspect, an embodiment of the present invention provides a communications method for a single-frequency WLAN, including:

monitoring, by each access point AP in a same single-frequency wireless local area network WLAN, a Clear To Send CTS or Request To Send RTS packet whose receiver or sender is a neighboring AP inside the single-frequency WLAN; and when a CTS or RTS packet whose receiver or sender is a neighboring AP inside the single-frequency WLAN is detected, clearing a channel in a coverage direction of the AP.

With reference to the first aspect, in a first possible implementation manner, the method further includes:

sending, by each AP when receiving an RTS packet whose receiver is the AP itself, a CTS packet as a response to a terminal sending the RTS packet; and sending, by each AP when needing to send downlink data to a terminal in a coverage direction of the AP, an RTS packet whose receiver is the terminal to the terminal, and receiving a CTS packet sent by the terminal as a response.

With reference to the first aspect, the first possible implementation manner of the first aspect, in a second possible implementation manner, if each AP detects a CTS or RTS packet whose receiving address or sending address is a basic service set identifier BSSID of a neighboring AP, that the detected packet is a CTS or RTS packet whose receiver or sender is the neighboring AP inside the single-frequency WLAN.

With reference to the second possible implementation manner of the first aspect, in a third possible implementation manner, each AP acquires information about a BSSID of a neighboring AP in the single-frequency WLAN in the following manner:

sending, by each AP after accessing a single-frequency WLAN, a request for querying BSSIDs of all neighboring APs in the same single-frequency WLAN to a radio controller AC, where the AC is configured to manage all APs in the single-frequency WLAN; and receiving, by each AP, the BSSIDs of all the neighboring APs in the same single-frequency WLAN that are returned by the AC.

With reference to the first aspect, the first to the third possible implementation manners of the first aspect, in a fourth possible implementation manner, the clearing a channel in a coverage direction of the AP includes:

sending a CTS-to-self packet to each terminal in the coverage direction of the AP, and notifying the terminal in the coverage direction of the AP of suspending sending of data.

With reference to the fourth possible implementation manner of the first aspect, in a fifth possible implementation manner, the terminal in the coverage direction of the AP is notified, by adding a length value of a silent time to the CTS-to-self packet, of suspending sending of data based on the length value of the silent time; and the length value of the silent time is determined in the following manner:

when a CTS packet whose receiver or sender is a neighboring AP inside the single-frequency WLAN is detected, using a length value of a silent time that is carried in the detected CTS packet as the length value of the silent time that is carried in the CTS-to-self packet; or when an RTS packet whose receiver or sender is a neighboring AP inside the single-frequency WLAN is detected, subtracting a length value of a period of time during which the CTS-to-self packet is sent and a length value of interframe space from a length value of a silent time that is carried in the detected RTS packet, to obtain the length value of the silent time that is carried in the CTS-to-self packet.

According to a second aspect, an embodiment of the present invention provides a communications device for a single-frequency WLAN, where the device includes:

a monitoring module, configured to monitor a Clear To Send CTS or Request To Send RTS packet whose receiver or sender is a neighboring AP inside the single-frequency WLAN; and a channel clearing module, configured to: when the monitoring module detects a CTS or RTS packet whose receiver or sender is a neighboring AP inside the single-frequency WLAN, clear a channel in a coverage direction of the device.

With reference to the second aspect, in a first possible implementation manner, the device further includes:

a sending module, configured to: when a receiving module receives an RTS packet whose receiver is the device itself, send a CTS packet as a response to a terminal sending the RTS packet; and when downlink data needs to be sent to a terminal in the coverage direction of the device, send an RTS packet whose receiver is the terminal to the terminal; and the receiving module, configured to receive the RTS packet whose receiver is the device, and receive a CTS packet sent by the terminal as a response.

With reference to the second aspect, the first possible implementation manner of the second aspect, in a second possible implementation manner, the monitoring module is specifically configured to: if a CTS or RTS packet whose receiving address or sending address is a basic service set identifier BSSID of a neighboring AP is detected, determine that the detected packet is a CTS or RTS packet whose receiver or sender is the neighboring AP inside the single-frequency WLAN.

With reference to the second possible implementation manner of the second aspect, in a third possible implementation manner, the monitoring module is further configured to: after the device accesses the single-frequency WLAN, send a request for querying BSSIDs of all neighboring APs in the same single-frequency WLAN to a radio controller AC, and receive the BSSIDs of all the neighboring APs in the same single-frequency WLAN that are returned by the AC, where the AC is configured to manage all APs in the single-frequency WLAN.

With reference to the second aspect, the first to the third possible implementation manners of the second aspect, in a fourth possible implementation manner, the channel clearing module is specifically configured to send a CTS-to-self packet to each terminal in the coverage direction of the device, to notify the terminal in the coverage direction of the device of suspending sending of data.

With reference to the fourth possible implementation manner of the second aspect, in a fifth possible implementation manner, the channel clearing module is further configured to notify, by adding a length value of a silent time to the CTS-to-self packet, the terminal in the coverage direction of the device of suspending sending of data based on the length value of the silent time; and the length value of the silent time is determined in the following manner: when the monitoring module detects a CTS packet whose receiver or sender is a neighboring AP inside the single-frequency WLAN, using a length value of a silent time that is carried in the detected CTS packet as the length value of the silent time that is carried in the CTS-to-self packet; or when the monitoring module detects an RTS packet whose receiver or sender is a neighboring AP inside the single-frequency WLAN, subtracting a length value of a period of time during which the CTS-to-self packet is sent and a length value of interframe space from a length value of a silent time that is carried in the detected RTS packet, to obtain the length value of the silent time that is carried in the CTS-to-self packet.

According to a third aspect, an embodiment of the present invention provides a communications device for a single-frequency WLAN, including:

a monitor, configured to monitor a Clear To Send CTS or Request To Send RTS packet whose receiver or sender is a neighboring AP inside the single-frequency WLAN, and when a CTS or RTS packet whose receiver or sender is a neighboring AP inside the single-frequency WLAN is detected, notify a processor; and the processor, configured to clear a channel in a coverage direction of the device according to the notification of the monitor.

With reference to the third aspect, in a first possible implementation manner, the device further includes:

a transceiver, configured to: when an RTS packet whose receiver is the device is received, send a CTS packet as a response to a terminal sending the RTS packet, and when downlink data needs to be sent to a terminal in the coverage direction of the device, send an RTS packet whose receiver is the terminal to the terminal; and receive a CTS packet sent by the terminal as a response.

With reference to the third aspect, the first possible implementation manner of the third aspect, in a second possible implementation manner, the monitor is specifically configured to: if a CTS or RTS packet whose receiving address or sending address is a basic service set identifier BSSID of a neighboring AP is detected, determine that the detected packet is a CTS or RTS packet whose receiver or sender is the neighboring AP inside the single-frequency WLAN.

The second possible implementation manner of the third aspect, in a third possible implementation manner, the monitor is further configured to: after the device accesses the single-frequency WLAN, send a request for querying BSSIDs of all neighboring APs in the same single-frequency WLAN to a radio controller AC, and receive the BSSIDs of all the neighboring APs in the same single-frequency WLAN that are returned by the AC, where the AC is configured to manage all APs in the single-frequency WLAN.

With reference to the third aspect, the first to the third possible implementation manners of the third aspect, in a fourth possible implementation manner, the processor is specifically configured to notify, by constructing a CTS-to-self packet, a terminal in the coverage direction of the device of suspending sending of data, and transfer the CTS-to-self packet to the transceiver; and the transceiver is further configured to send, to each terminal in the coverage direction of the device, the CTS-to-self packet transferred by the processor.

With reference to the fourth possible implementation manner of the third aspect, in a fifth possible implementation manner, the processor is further configured to notify, by adding a length value of a silent time to the CTS-to-self packet, the terminal in the coverage direction of the device of suspending sending of data based on the length value of the silent time; and the length value of the silent time is determined in the following manner: when the monitor detects a CTS packet whose receiver or sender is a neighboring AP inside the single-frequency WLAN, using a length value of a silent time that is carried in the detected CTS packet as the length value of the silent time that is carried in the CTS-to-self packet; or when the monitor detects an RTS packet whose receiver or sender is a neighboring AP inside the single-frequency WLAN, subtracting a length value of a period of time during which the CTS-to-self packet is sent and a length value of interframe space from a length value of a silent time that is carried in the detected RTS packet, to obtain the length value of the silent time that is carried in the CTS-to-self packet.

With reference to the third aspect, the first to fifth possible implementation manners of the third aspect, in a sixth possible implementation manner, the communications device for the single-frequency WLAN is an AP.

Beneficial effects of the embodiments of the present invention include:

According to the foregoing communications method and device for a single-frequency WLAN that are provided in the embodiments of the present invention, an AP monitors a CTS or RTS packet whose receiver or sender is a neighboring AP inside the single-frequency WLAN; and when a CTS or RTS packet whose receiver or sender is a neighboring AP inside the single-frequency WLAN is detected, a channel in a coverage direction of the AP is cleared. Multiple APs in a single-frequency WLAN form one "omnidirectional group". When any of the APs in the "omnidirectional group" performs RTS/CTS exchange with a STA inside a coverage area of the AP, neighboring APs can also work cooperatively, channels in coverage directions of the neighboring APs are cleared, and data communication in the coverage directions of the neighboring APs is suspended, thereby effectively avoiding network conflicts, and improving network performance of the single-frequency WLAN.

DESCRIPTION OF EMBODIMENTS

With reference to the accompanying drawings of the specification, the following describes specific implementation manners of a communications method and device for a single-frequency wireless local area network that are provided in embodiments of the present invention.

Figure 4:
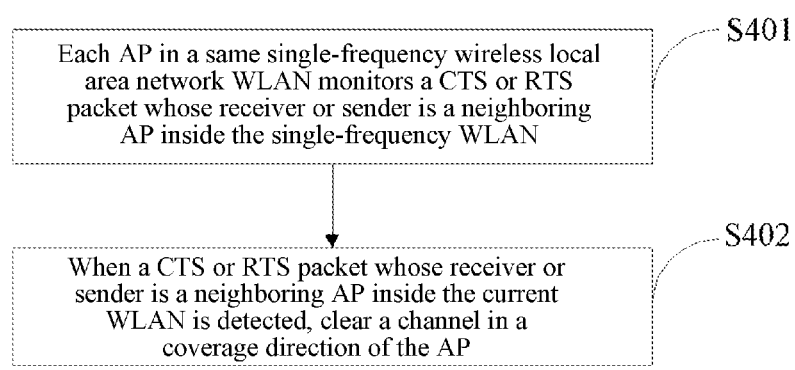
FIG. 4 is a flowchart of a communications method for a single-frequency wireless local area network according to an embodiment of the present invention.

An embodiment of the present invention provides a communications method for a single-frequency wireless local area network. As shown in FIG. 4, the method specifically includes the following steps:

S401: Each AP in a same single-frequency wireless local area network WLAN detects a CTS or RTS packet whose receiver or sender is a neighboring AP inside the single-frequency WLAN.

S402: When a CTS or RTS packet whose receiver or sender is a neighboring AP inside the single-frequency WLAN is detected, clear a channel in a coverage direction of the AP.

Figure 5:
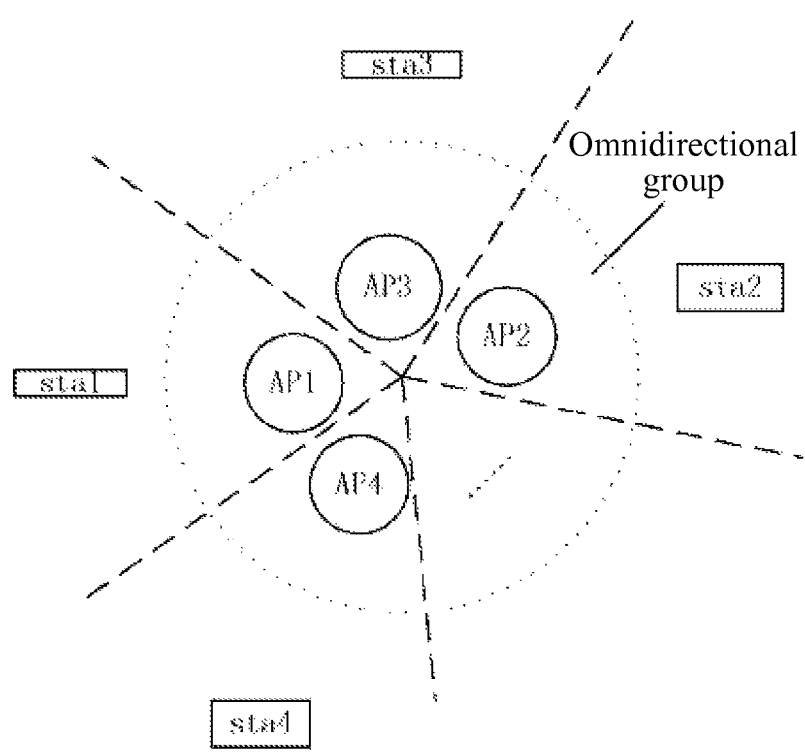
FIG. 5 is a network architecture diagram of a single-frequency wireless local area network according to an embodiment of the present invention.

In the foregoing communications method for a single-frequency wireless local area network that is provided in this embodiment of the present invention, a single-frequency WLAN includes multiple (more than two) APs placed at a same distribution point. The multiple APs all work in a same frequency band, each of the APs uses a directional antenna to directionally cover a particular area, and a network architecture is shown in FIG. 5. For example, in a single-frequency WLAN in which a quantity of APs is 3, a coverage area of each AP is 120 degrees. Certainly, this embodiment of the present invention is not limited to a case in which the quantity of APs is 3. When the quantity of APs is 2, 3, or larger, respective coverage areas of the APs also change correspondingly.

In this embodiment of the present invention, in fact the multiple APs in the same single-frequency WLAN are regarded as one "omnidirectional group" that works cooperatively, and an RTS/CTS mechanism is used cooperatively in this group to avoid an air interface conflict in the entire WLAN.

Specifically, when any of the APs in this "omnidirectional group" accesses the single-frequency WLAN, a radio controller (Access Controller, AC) responsible for managing the WLAN records related information of APs that are already online currently in the single-frequency WLAN. After the AP accesses the single-frequency WLAN, a request for querying basic service set identifiers (Basic Service Set Identifier, BSSID) of all neighboring APs in the same single-frequency WLAN is sent to the AC (inside the "omnidirectional group", one AP may be uniquely identified by one BSSID). Then, the BSSIDs of all the neighboring APs in the same single-frequency WLAN that are returned by the AC are received.

During the foregoing process, signaling exchange between an AP and an AC may be performed by using a Control And Provisioning of Wireless Access Points Protocol Specification (Control And Provisioning of Wireless Access Points Protocol Specification, CAPWAP) control tunnel.

After the foregoing process, each AP in the same single-frequency WLAN has acquired information about BSSIDs of neighboring APs in the same WLAN, thereby implementing sharing of BSSID information.

In the communications method for a single-frequency wireless local area network that is provided in this embodiment of the present invention, when an AP in an "omnidirectional group" performs data communication with a STA in a coverage direction of the AP, an existing RTS/CTS protection mechanism is used.

Specifically, for data communication in an uplink direction, when each AP receives an RTS packet whose receiver is the AP, the AP sends a CTS packet as a response to a terminal sending the RTS packet.

For data communication in a downlink direction, when each AP needs to send downlink data to a terminal in a coverage direction of the AP, the AP sends an RTS packet whose receiver is the terminal to the STA, and receives a CTS packet sent by the terminal as a response.

In addition, each AP further needs to monitor, in an "omnidirectional group" in a WLAN, a CTS or RTS packet whose receiver or sender is a neighboring AP inside the single-frequency WLAN. During a monitoring process, a receiving address or a sending address in an RTS or CTS packet is identified to determine whether the packet is an RTS/CTS packet related to a neighboring AP (a CTS or RTS packet whose receiver or sender is a neighboring AP inside the single-frequency WLAN). For example, when it detects that a receiving address of an RTS packet is a BSSID of AP1, a neighbor of the AP, it may be considered that an RTS packet whose receiver is AP1 is detected.

By using data communication in uplink and downlink directions as examples, the following describes in detail the foregoing communications method for a single-frequency wireless local area network that is provided in this embodiment of the present invention.

1) Data Communication in an Uplink Direction

After an AP in a single-frequency WLAN receives an RTS packet (a receiving address of the RTS packet is a BSSID of the AP) in a coverage direction of the AP, the AP returns, based on an RTS/CTS protection mechanism, a corresponding CTS packet to a STA sending the RTS packet. A sending address in the CTS packet is the BSSID of the AP, and the CTS packet carries a length of a period of time during which other STAs are expected to be silent.

Because a channel in a WLAN network is an exclusive channel, when the AP receives an RTS packet sent to the AP, neighboring APs in the same single-frequency WLAN can only complete the following work:

The neighboring APs monitor an RTS packet whose receiving address is the AP or a CTS packet whose sending address is the AP, and after one of these two packets is detected, clear channels in coverage directions corresponding to the neighboring APs.

Preferably, in this embodiment of the present invention, the neighboring APs may send CTS packets whose receiving addresses are the neighboring APs (that is, CTS-to-Self packets) in the coverage directions of the neighboring APs to clear the channels in the corresponding coverage directions, to notify terminals in the coverage directions of the neighboring APs of suspending sending of data.

Specifically, CTS-to-Self packets are sent to clear the channels in the corresponding coverage directions, that is, the terminals in the coverage directions of the neighboring APs are notified of suspending sending of data, which is mainly implemented by adding a length of a silent time to the CTS-to-Self packets. The terminals need to suspend sending of data within a period of time based on the length of the silent time.

A length value of a silent time that is in the CTS-to-Self packet is determined in the following manner:

when a CTS packet whose receiver or sender is a neighboring AP inside the single-frequency WLAN is detected, using a length value of a silent time that is carried in the detected CTS packet as the length value of the silent time that is carried in the CTS-to-self packet; or when an RTS packet whose receiver or sender is a neighboring AP inside the single-frequency WLAN is detected, subtracting a length value of a period of time during which the CTS-to-self packet is sent and a length value of interframe space from a length value of a silent time that is carried in the detected RTS packet, to obtain the length value of the silent time that is carried in the CTS-to-self packet.

In Section 8.3.1.3 in the existing standard protocol IEEE Standard 802.11 (2012)-Part 11: Wireless LAN Medium Access Control (MAC) and Physical Layer (PHY) Specifications, Length value of a silent time that is carried an RTS packet=Time occupied for sending a data packet+Frame interval+Subsequent time occupied for sending a CTS packet+ACK time, and an end receiving the RTS packet subtracts time occupied for sending CTS and interframe space from the length value of the silent period of time, and uses the result as a length of an occupied period of time that is carried in the CTS packet. In this embodiment of the present invention, a similar processing manner is used, and a length value of a period of time during which the CTS-to-self packet (a special CTS packet whose receiver is the AP itself) is sent and a length value of interframe space are subtracted from a length value of a silent time that is carried in an detected RTS packet, to obtain the length value of the silent time that is carried in the CTS-to-self packet.

In a case of uplink data communication, because APs in a single-frequency WLAN are located at a same distribution point and have relatively short distances from each other, due to limitation of a network, even a neighboring AP cannot monitor an RTS packet whose receiver is the AP that is sent by a terminal, and usually can definitely monitor a CTS packet sent by the AP. Therefore, neighboring APs only need to monitor one of RTS packets whose receiver is the AP or one of CTS packets whose sender is the AP, and once one of the packets is detected, the neighboring APs send CTS-to-Self packets to clear channels in corresponding coverage directions. Even if both types of packets are detected, the operation of sending a CTS-to-Self packet to clear a channel does not need to be performed repeatedly.

Figure 1:
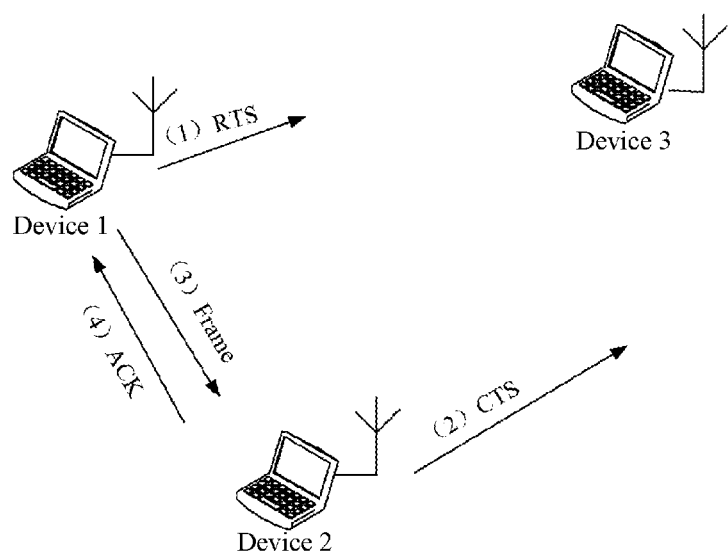
FIG. 1 is a network schematic diagram showing that RTS and CTS frames are used to clear a transmit area between two devices in a WLAN in the prior art.
Figure 2:
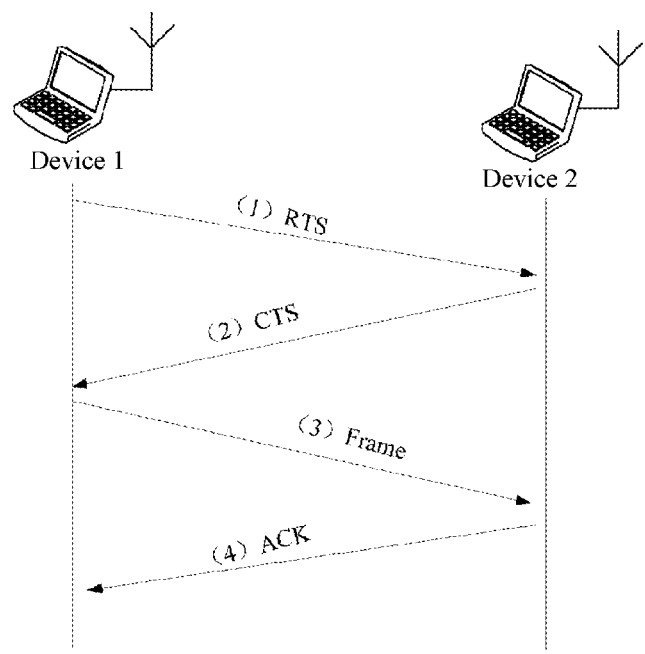
FIG. 2 is a signaling exchange diagram showing that RTS and CTS frames are used to clear a transmit area between the two devices shown in FIG. 1.
Figure 3:
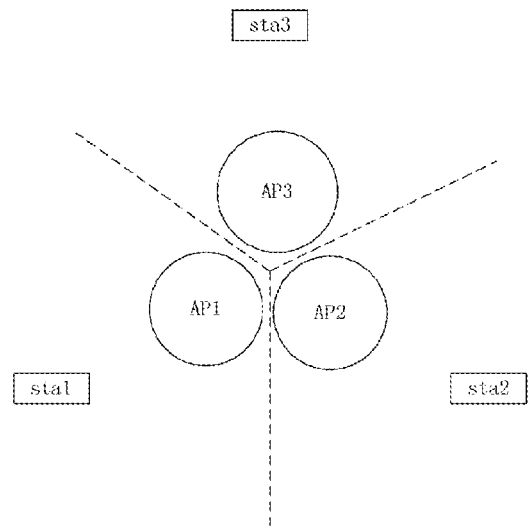
FIG. 3 is a network architecture diagram of an example of a single-frequency WLAN in the prior art.

The example shown in FIG. 3 is still used for description. It is assumed that after receiving RTS sent by STA1 in a coverage direction of AP1, AP1 sends CTS as a response to STA1.

AP2 and AP3 in other two directions complete the following work during such a process:

1. If RTS whose receiving address is AP1 is detected, AP2 and AP3 actively send Cts-to-self packets (whose receivers are AP2 and AP3) to clear channels in corresponding coverage directions.

2. If RTS whose receiving address is AP1 is not detected, when a CTS packet sent by AP1 to STA1 is detected, AP2 and AP3 send Cts-to-self packets (whose receivers are AP2 and AP3) to clear channels in corresponding coverage directions.

Figure 6:
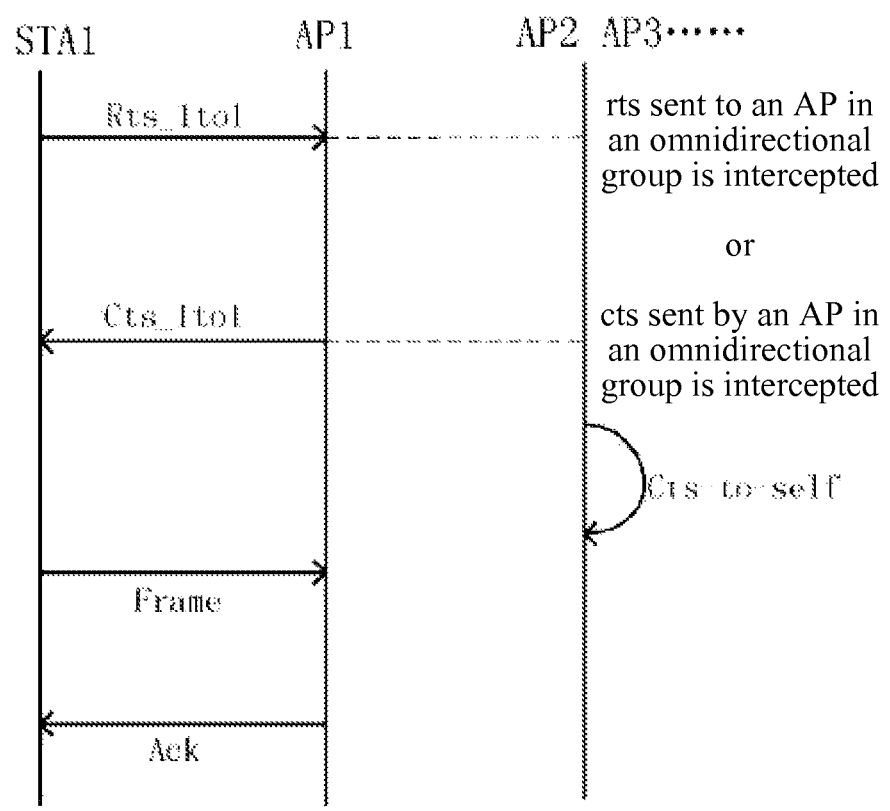
FIG. 6 is a signaling exchange diagram of an example in an uplink direction according to an embodiment of the present invention.

FIG. 6 describes such a process: STA1 in the coverage direction of AP1 sends an Rts_1to1 packet to AP1, and AP1 returns a Cts_1to1 packet to STA1. At the same time, AP2 and AP3 monitor the foregoing two packets. Once monitoring the packets, AP2 and AP3 send Cts-to-self packets to clear the channels in the corresponding coverage directions.

2) Data Communication in a Downlink Direction

Because APs in an "omnidirectional group" in the foregoing single-frequency WLAN are distributed at a same point, and the APs are located at a same distribution point and have relatively short distances from each other, due to limitation of a network, an AP usually can definitely monitor an RTS packet sent by a neighboring AP of the AP before the neighboring AP sends data, but may not monitor a CTS packet sent, as a response, by a terminal that is not in a coverage direction of the AP. However, for data communication in a downlink direction, an operation to clear a channel covered the AP may still be triggered by monitoring an RTS packet whose sender is a neighboring AP inside the "omnidirectional group" or a CTS packet whose receiver is a neighboring AP in the "omnidirectional group" at the same time.

The example in FIG. 3 is still used for description. It is assumed that AP1 needs to send data to the terminal STA1 in the coverage direction of AP1, before performing data communication with STA1, AP1 sends, based on an RTS/CTS protection mechanism, an RTS packet (an Rts_1to1 packet) to STA1, and receives a CTS packet (a Cts_1to1 packet) sent by STA1 as a response.

Figure 7:
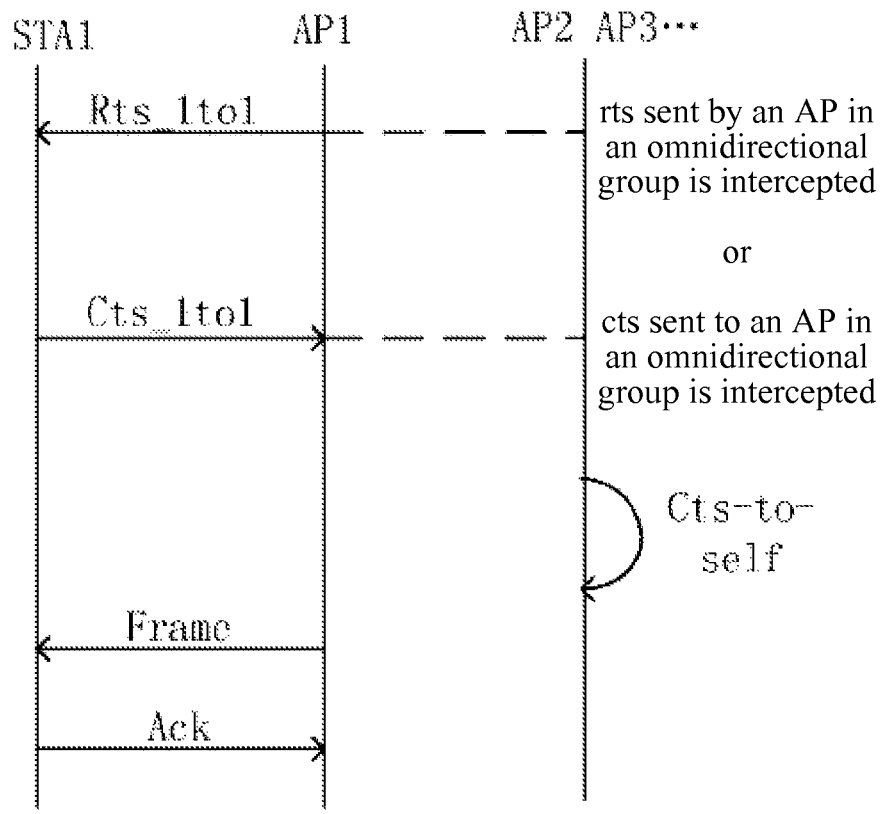
FIG. 7 is a signaling exchange diagram of an example in a downlink direction according to an embodiment of the present invention.

As shown in FIG. 7, at the same time, once monitoring an Rts_1to1 packet or a Cts_1to1 packet sent by AP1, AP2 and AP3 actively send Cts-to-self packets to clear the channels in the corresponding coverage directions.

Figure 8:
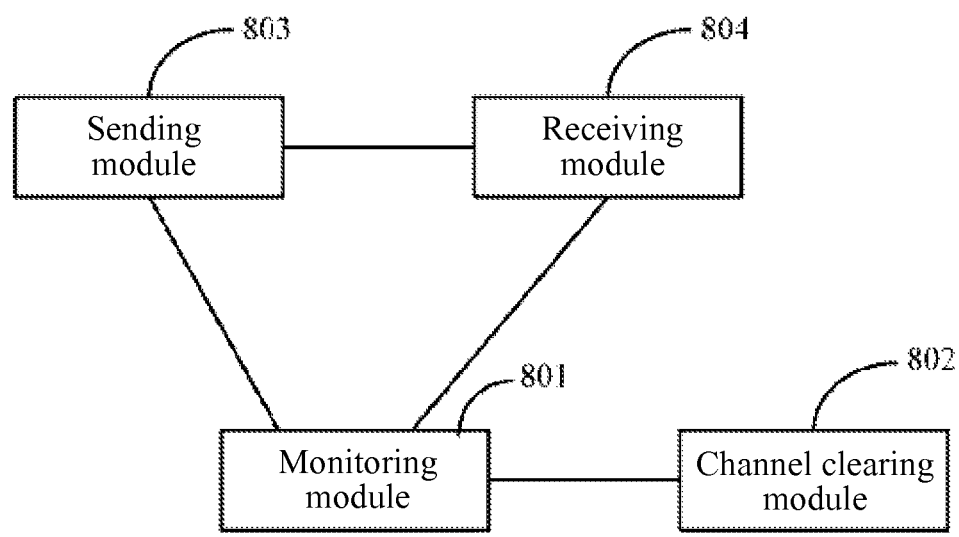
FIG. 8 is a schematic structural diagram of a first communications device for a single-frequency WLAN according to an embodiment of the present invention.

As shown in FIG. 8, a first communications device for a single-frequency wireless local area network (WLAN) that is provided in an embodiment of the present invention includes:

a monitoring module 801, configured to monitor a Clear To Send CTS or Request To Send RTS packet whose receiver or sender is a neighboring AP inside the single-frequency WLAN; and a channel clearing module 802, configured to: when the monitoring module 801 detects a CTS or RTS packet whose receiver or sender is a neighboring AP inside the single-frequency WLAN, clear a channel in a coverage direction of the communications device.

Further, as shown in FIG. 8, the first communications device for a single-frequency WLAN further includes:

a sending module 803, configured to: when a receiving module 804 receives an RTS packet whose receiver is the communications device, send a CTS packet as a response to a terminal sending the RTS packet; and when downlink data needs to be sent to a terminal in the coverage direction of the communications device, send an RTS packet whose receiver is the terminal to the terminal; and the receiving module 804, configured to receive the RTS packet whose receiver is the communications device, and receive a CTS packet sent by the terminal as a response.

Further, the monitoring module 801 in the first communications device for a single-frequency WLAN is specifically configured to: if a CTS or RTS packet whose receiving address or sending address is a basic service set identifier BSSID of a neighboring AP is detected, determine that the detected packet is a CTS or RTS packet whose receiver or sender is the neighboring AP inside the single-frequency WLAN.

Further, the monitoring module 801 is further configured to: after the communications device accesses the single-frequency WLAN, send a request for querying BSSIDs of all neighboring APs in the same single-frequency WLAN to a radio controller AC, and receive the BSSIDs of all the neighboring APs in the same single-frequency WLAN that are returned by the AC, where the AC is configured to manage all APs in the single-frequency WLAN.

Further, the channel clearing module 802 is specifically configured to send a CTS-to-self packet to each terminal in the coverage direction of the communications device, and notify the terminal in the coverage direction of the communications device of suspending sending of data.

Further, the channel clearing module 802 is further configured to notify, by adding a length value of a silent time to the CTS-to-self packet, the terminal in the coverage direction of the communications device of suspending sending of data based on the length value of the silent time; and the length value of the silent time is determined in the following manner: when the monitoring module 801 detects a CTS packet whose receiver or sender is a neighboring AP inside the single-frequency WLAN, using a length value of a silent time that is carried in the detected CTS packet as the length value of the silent time that is carried in the CTS-to-self packet; or when the monitoring module 801 detects an RTS packet whose receiver or sender is a neighboring AP inside the single-frequency WLAN, subtracting a length value of a period of time during which the CTS-to-self packet is sent and a length value of interframe space from a length value of a silent time that is carried in the detected RTS packet, to obtain the length value of the silent time that is carried in the CTS-to-self packet.

Figure 9:
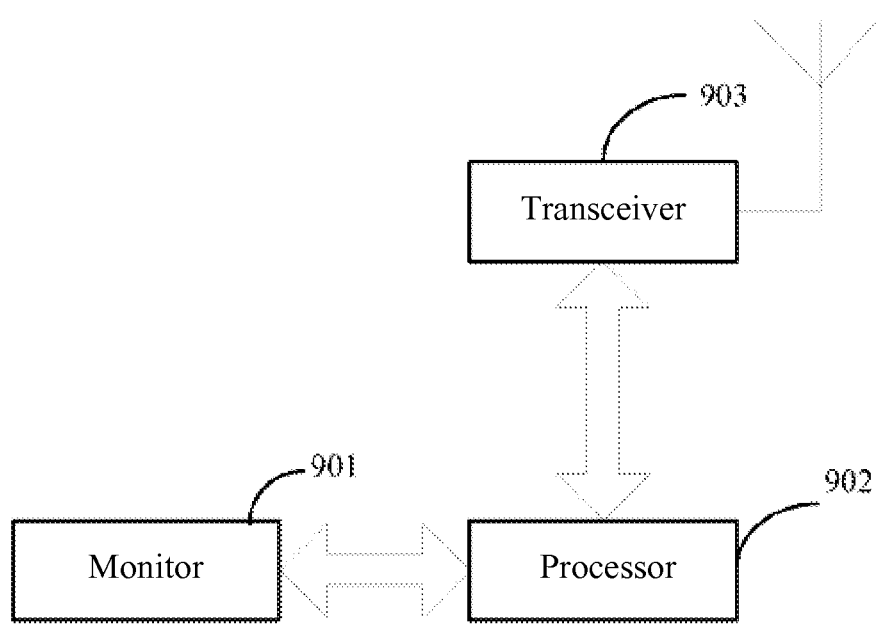
FIG. 9 is a schematic structural diagram of a second communications device for a single-frequency WLAN according to an embodiment of the present invention.

As shown in FIG. 9, a second communications device for a single-frequency wireless local area network (WLAN) that is provided in an embodiment of the present invention includes:

a monitor 901, configured to monitor a Clear To Send CTS or Request To Send RTS packet whose receiver or sender is a neighboring AP inside the single-frequency WLAN, and when a CTS or RTS packet whose receiver or sender is a neighboring AP inside the single-frequency WLAN is detected, notify a processor 902; and the processor 902, configured to clear a channel in a coverage direction of the communications device according to the notification of the monitor 901.

Further, as shown in FIG. 9, the second communications device for a single-frequency WLAN further includes:

a transceiver 903, configured to: when an RTS packet whose receiver is the communications device is received, send a CTS packet as a response to a terminal sending the RTS packet; and when downlink data needs to be sent to a terminal in the coverage direction of the communications device, send an RTS packet whose receiver is the terminal to the terminal; and receive a CTS packet sent by the terminal as a response.

Further, the monitor 901 is specifically configured to: if a CTS or RTS packet whose receiving address or sending address is a basic service set identifier BSSID of a neighboring AP is detected, determine that the detected packet is a CTS or RTS packet whose receiver or sender is the neighboring AP inside the single-frequency WLAN.

Further, the monitor 901 is further configured to: after the communications device accesses the single-frequency WLAN, send a request for querying BSSIDs of all neighboring APs in the same single-frequency WLAN to a radio controller AC, and receive the BSSIDs of all the neighboring APs in the same single-frequency WLAN that are returned by the AC, where the AC is configured to manage all APs in the single-frequency WLAN.

Further, the processor 902 is specifically configured to notify, by constructing a CTS-to-self packet, a terminal in the coverage direction of the communications device of suspending sending of data, and transfer the CTS-to-self packet to the transceiver 903; and the transceiver 903 is further configured to send, to each terminal in the coverage direction of the communications device, the CTS-to-self packet transferred by the processor 902.

The processor 902 is specifically configured to send the CTS-to-self packet to each terminal in the coverage direction of the communications device, and notify the terminal in the coverage direction of the communications device of suspending sending of data.

Further, the processor 902 is further configured to notify, by adding a length value of a silent time to the CTS-to-self packet, the terminal in the coverage direction of the communications device of suspending sending of data based on the length value of the silent time; and the length value of the silent time is determined in the following manner: when the monitor 901 detects a CTS packet whose receiver or sender is a neighboring AP inside the single-frequency WLAN, using a length value of a silent time that is carried in the detected CTS packet as the length value of the silent time that is carried in the CTS-to-self packet; or when the monitor 901 detects an RTS packet whose receiver or sender is a neighboring AP inside the single-frequency WLAN, subtracting a length value of a period of time during which the CTS-to-self packet is sent and a length value of interframe space from a length value of a silent time that is carried in the detected RTS packet, to obtain the length value of the silent time that is carried in the CTS-to-self packet.

Further, the second communications device for a single-frequency WLAN may be an AP.

In the foregoing communications method and device for a single-frequency WLAN that are provided in the embodiments of the present invention, an AP detects a CTS or RTS packet whose receiver or sender is a neighboring AP inside the single-frequency WLAN; and when a CTS or RTS packet whose receiver or sender is a neighboring AP inside the single-frequency WLAN is detected, a channel in a coverage direction of the AP is cleared. Multiple APs in the single-frequency WLAN form one "omnidirectional group". When any of the APs in the "omnidirectional group" performs RTS/CTS exchange with a STA inside a coverage area of the AP, neighboring APs can also work cooperatively, channels in coverage directions of the neighboring APs are cleared, and data communication in the coverage directions of the neighboring APs is suspended, thereby effectively avoiding network conflicts, and improving network performance of the single-frequency WLAN.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communications method for a single-frequency wireless local area network (WLAN), wherein the single-frequency WLAN includes multiple access points (APs) working in a same frequency band; and the method comprises:
    monitoring, by an access point (AP) in a single-frequency WLAN, a Clear To Send (CTS) or Request To Send (RTS) packet whose receiver or sender is a neighboring AP inside the single-frequency WLAN;
    when a CTS or RTS packet whose receiver or sender is the neighboring AP inside the single-frequency WLAN is detected, clearing a channel in a coverage provided by a directional antenna of the AP; and
    sending a CTS-to-self packet to a terminal in the coverage provided by a directional antenna of the AP to notify the terminal in the coverage provided by a directional antenna of the AP of suspending sending of data, wherein:
    a length value of a silent time is included in the CTS-to-self packet to notify the terminal in the coverage provided by the directional antenna of the AP of suspending sending of data based on the length value of the silent time; and
    the length value of the silent time is determined in the following manner:
    when an RTS packet whose receiver or sender is the neighboring AP inside the single-frequency WLAN is detected, subtracting a length value of a period of time during which the CTS-to-self packet is sent and a length value of interframe space from a length value of a silent time that is carried in the detected RTS packet, to obtain a length value of the silent time that is carried in the CTS-to-self packet.

2. The method according to claim 1, further comprising:
sending, by the AP when receiving an RTS packet whose receiver is the AP itself, a CTS packet as a response to a terminal sending the RTS packet;
sending, by the AP when needing to send downlink data to a terminal, an RTS packet to the terminal; and
receiving, by the AP, a CTS packet sent by the terminal as a response.

3. The method according to claim 1, wherein:
in case that the AP detects a CTS or RTS packet whose receiving address or sending address is a basic service set identifier (BSSID) of a neighboring AP, the AP determines that the detected packet is a CTS or RTS packet whose receiver or sender is the neighboring AP inside the single-frequency WLAN.

4. The method according to claim 3, wherein the AP acquires information about the BSSID of a neighboring AP in the single-frequency WLAN in the following manner:
sending, by the AP after accessing the single-frequency WLAN, a request for querying BSSIDs of all neighboring APs in the same single-frequency WLAN to an access controller (AC), wherein the AC is configured to manage all APs in the single-frequency WLAN; and
receiving, by the AP, the BSSIDs of all the neighboring APs in the same single-frequency WLAN from the AC.

5. The method according to claim 1, wherein the clearing the channel in a coverage provided by the directional antenna of the AP comprises:
sending a CTS-to-self packet to a terminal in the coverage provided by a directional antenna of the AP to notify the terminal in the coverage provided by a directional antenna of the AP of suspending sending of data.

6. The method according to claim 5, wherein:
a length value of a silent time is included in the CTS-to-self packet to notify the terminal in the coverage provided by the directional antenna of the AP of suspending sending of data based on the length value of the silent time; and
the length value of the silent time is determined in the following manner:
when a CTS packet whose receiver or sender is a neighboring AP inside the single-frequency WLAN is detected, using a length value of a silent time that is carried in the detected CTS packet as the length value of the silent time that is carried in the CTS-to-self packet.

7. An access point (AP) for a single-frequency wireless local area network (WLAN), wherein the single-frequency WLAN includes multiple APs working in a same frequency band; and the AP comprises:
a processor and a transceiver coupled with the processor; wherein:
the transceiver is configured to monitor a Clear To Send (CTS) or Request To Send (RTS) packet whose receiver or sender is a neighboring AP inside the single-frequency WLAN;
the processor is configured to: when a CTS or RTS packet whose receiver or sender is a neighboring AP inside the single-frequency WLAN is detected by the transceiver, clear a channel in a coverage provided by a directional antenna of the AP; and
the transceiver is configured to send a CTS-to-self packet to a terminal in the coverage provided by a directional antenna of the AP to notify the terminal in the coverage provided by a directional antenna of the AP of suspending sending of data, wherein:
a length value of a silent time is included in the CTS-to-self packet to notify the terminal in the coverage provided by the directional antenna of the AP of suspending sending of data based on the length value of the silent time; and
the length value of the silent time is determined in the following manner:
when an RTS packet whose receiver or sender is the neighboring AP inside the single-frequency WLAN is detected, subtracting a length value of a period of time during which the CTS-to-self packet is sent and a length value of interframe space from a length value of a silent time that is carried in the detected RTS packet, to obtain a length value of the silent time that is carried in the CTS-to-self packet.

8. The AP according to claim 7, wherein the transceiver is configured to: when an RTS packet whose receiver is the AP itself is received, send a CTS packet as a response to a terminal sending the RTS packet, and when downlink data needs to be sent to a terminal, send an RTS packet to the terminal; and receive a CTS packet sent by the terminal as a response.

9. The AP according to claim 7, wherein the processor is configured to: in case that a CTS or RTS packet whose receiving address or sending address is a basic service set identifier (BSSID) of a neighboring AP is detected, determine that the detected packet is the CTS or RTS packet whose receiver or sender is the neighboring AP inside the single-frequency WLAN.

10. The AP according to claim 9, wherein the transceiver is configured to: after the AP accesses the single-frequency WLAN, send a request for querying BSSIDs of all neighboring APs in the same single-frequency WLAN to an access controller (AC), and receive the BSSIDs of all the neighboring APs in the same single-frequency WLAN from the AC, wherein the AC is configured to manage all APs in the single-frequency WLAN.

11. The AP according to claim 7, wherein the processor is configured to clear the channel in the coverage provided by the directional antenna of the AP, comprising:
the processor is configured to trigger the transceiver to send a CTS-to-self packet to a terminal in the coverage provided by the directional antenna of the AP, to notify the terminal in the coverage provided by the directional antenna of the AP of suspending sending of data.

12. The AP according to claim 11, wherein the processor is configured to add a length value of a silent time in the CTS-to-self packet to notify the terminal in the coverage provided by the directional antenna of the AP of suspending sending of data based on the length value of the silent time; and the length value of the silent time is determined in the following manner:
when the transceiver detects a CTS packet whose receiver or sender is a neighboring AP inside the single-frequency WLAN, using a length value of a silent time that is carried in the detected CTS packet as the length value of the silent time that is carried in the CTS-to-self packet.

* * * * *